Nov. 28, 1944.   J. LE G. SKINNER   2,363,812
ENGINE CONTROL MECHANISM
Filed Jan. 20, 1943   2 Sheets-Sheet 2

J. LeGrand Skinner
INVENTOR

BY
ATTORNEY

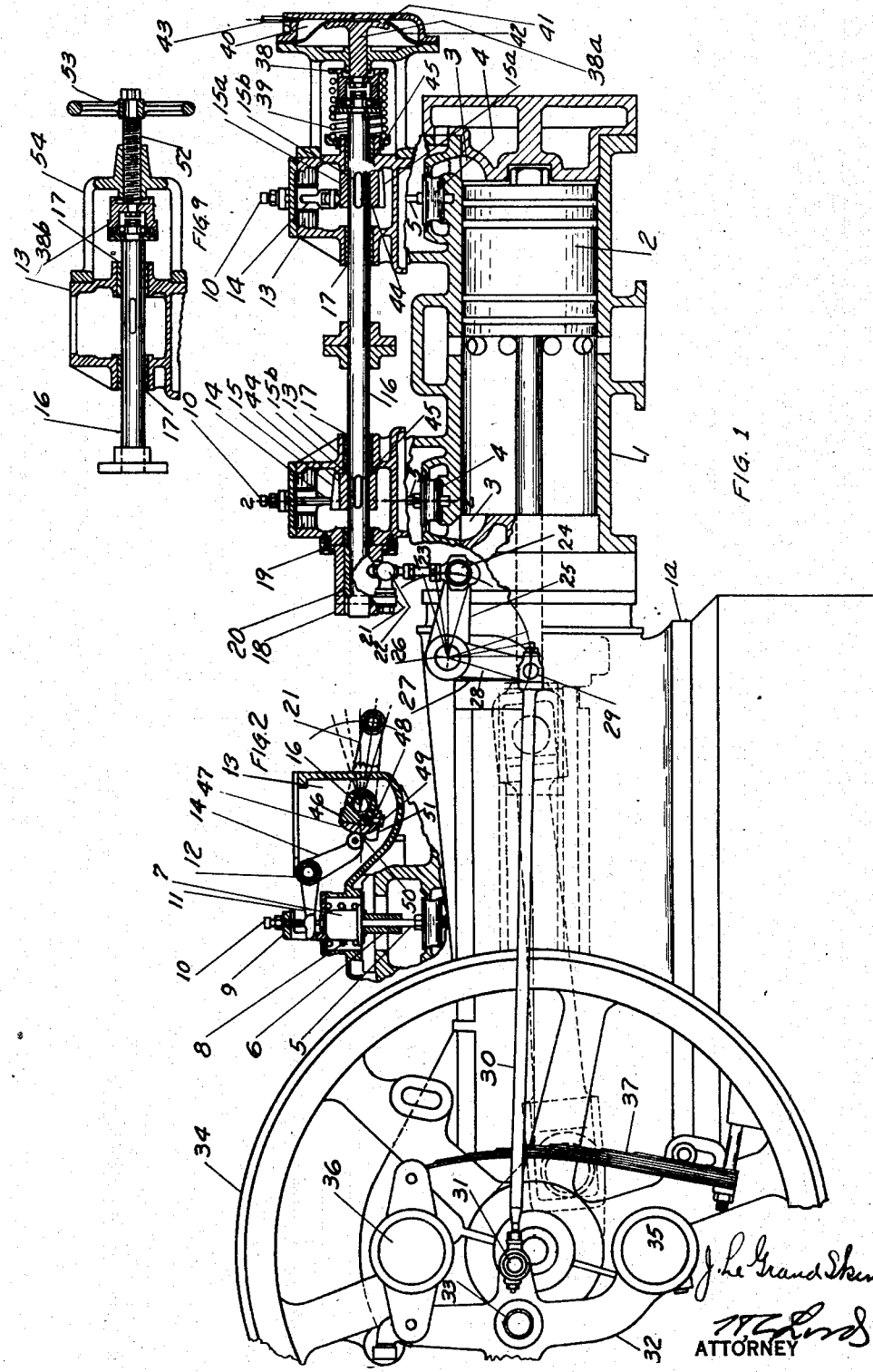

Patented Nov. 28, 1944

2,363,812

UNITED STATES PATENT OFFICE 2,363,812

ENGINE CONTROL MECHANISM

James Le Grand Skinner, Erie, Pa., assignor to Skinner Engine Company, Erie, Pa., a corporation of Pennsylvania Application January 20, 1943, Serial No. 472,953

8 Claims. (Cl. 121—127)

The present invention is designed to provide an engine with control, through manual or pressure means, and also provide the engine with a speed control, the speed control providing the desirable safety against the running away of the engine, particularly through the removal of load.

Features and details of the invention will appear from the specification and claims.

Preferred embodiments of the invention are illustrated in the accompanying drawings as follows:

Fig. 1 a side elevation, partly in section, of the mechanism.

Fig. 2 a view of the valve actuating mechanism, partly in section, on the line 2—2 in Fig. 1.

Figure 3:
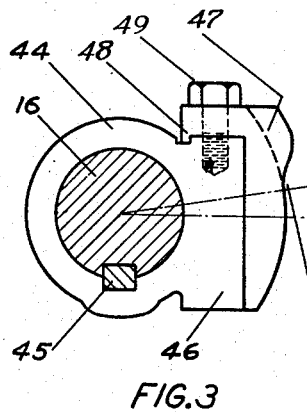

Fig. 3 an end view of one of the operating cams.

Figure 4:
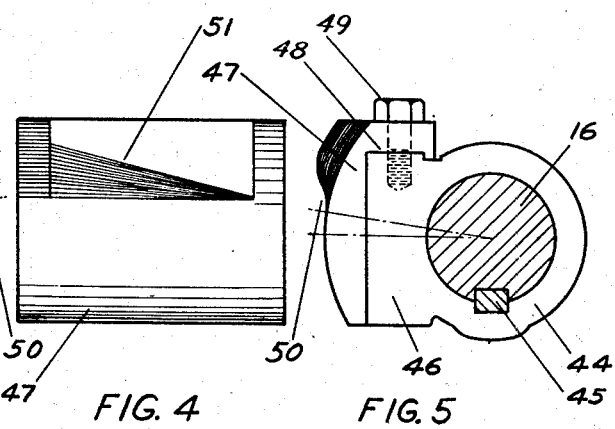

Fig. 4 a side elevation of the same cam.

Figure 5:
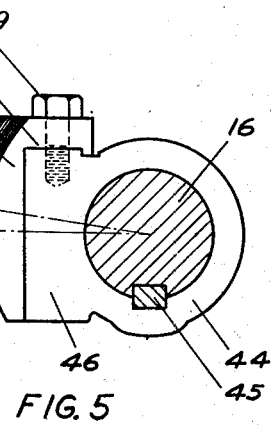

Fig. 5 an end view from the opposite end of the same cam.

Figure 6:
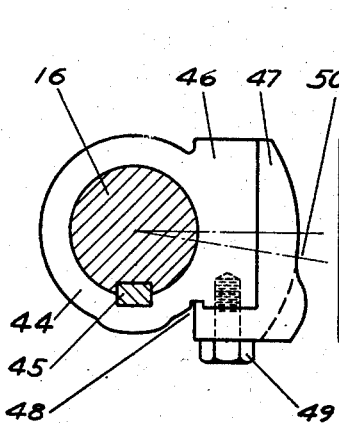

Fig. 6 an end view of the cam at the opposite end of the engine cylinder.

Figure 7:
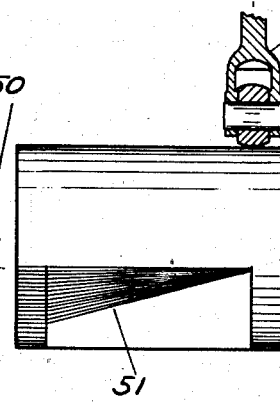

Fig. 7 a side elevation of the cam.

Figure 8:
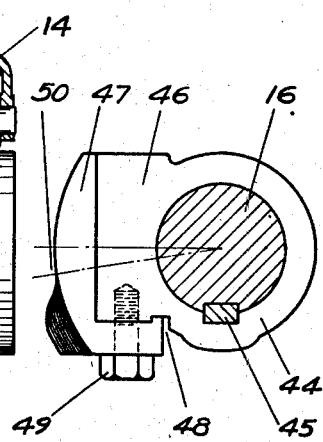

Fig. 8 an elevation of the cam from the opposite end from Fig. 6.

Fig. 9 a sectional view of an alternative manual control mechanism.

1 marks an engine cylinder, 1a an engine frame, 2 a piston operating in the cylinder, 3 inlet valve ports for the cylinder, 4 inlet valves of the poppet type controlling the inlet ports, 5 valve stems leading from the valves, 6 glands for the valve stems, 7 heads on the stems, 8 springs exerting closing pressure on the valves, 9 valve lifting arms, 10 adjusting screws on the arms, 11 rock arms adapted to lift the valves, 12 rocker pins journalled in brackets 13 mounted on the engine cylinder, 14 rock arms on the rocker pins 12, these rock arms being operated by cams 15 and 15a on a lay shaft 16, the cams being locked on the lay shaft by keys 15b. The lay shaft is journalled and slidingly mounted in bearings 17 in the brackets 13.

A sleeve 18 is journalled in a cap 19 on the bracket at the drive end of the cylinder. This sleeve 18 is splined on the lay shaft by a spline 20 locking the sleeve rotatively with the lay shaft but permitting sliding movement. An arm 21 extends from the sleeve 18 and a ball joint 22 connects the arm 21 through a link 23 and a joint 24 with a rock arm 25. The rock arm is mounted on a shaft 26 secured on a bracket 27 on the engine frame.

An arm 28 is fixed with the arm 25 and is connected by a joint 29 with the valve rod 30 extending to a joint 31 on a governor arm 32. The arm 32 is journalled on a pin 33 on a flywheel 34 of the engine. The arm is provided with a weight 35 at one end and connected by a weighted link 36 at the opposite end with a centripetally acting spring 37. This valve gear is one of common construction so far as at present described except as to the endwise movement of the lay shaft.

The end of the lay shaft opposite the sleeve 18 is provided with a head 38 and a spring 39 exerts yielding pressure holding the lay shaft to the right, as shown in Fig. 1. An extension 38a projects from the head 38 into a pressure cylinder 40. A head 41 on the extension 38a is operated upon by a diaphragm 42 secured in the chamber 40 and subjected to pressure directed through a pipe 43, the diaphragm moving the lay shaft toward the left when pressure is delivered and the spring returning the lay shaft toward the right.

The cams are illustrated in Figs. 3 to 8. These are of similar shape and are designed to operate alternately. They are provided with hubs 44 secured by keys 45 on the lay shaft. Cam sleeves 47 have grooved connections 48 with extensions 46 on the hubs 44 and are secured thereon by screws 49. The cam sleeves have an overrunning or closing portion 50 and a lift portion 51, this lift portion being inclined or of conical shape.

As the lay shaft is shifted either manually or through the pressure cylinder, the cam surface 51 is moved to present different portions of the incline to provide the desired lift for the valve. At the same time the lay shaft is reciprocated it is oscillated through the mechanism leading from the governor, permitting, however, the normal control through variations in lift due to axial shifting of the inclined cam surface. If, however, the speed becomes abnormal, the governor takes control and reduces the lay shaft travel to a point that will provide a desired speed at the minimum load.

In the alternative construction the head 38b is substituted for the head 38 and this is actuated by a screw 52 operated by a hand wheel 53, the screw operated through an extension 54 of the bracket 13. Thus the lay shaft may be manually positioned to give any valve lift desired.

In the operation of the device, the governor controls the speed in the ordinary manner by varying the throw of the governing eccentric 31, which variation is communicated through the rod 30, bell crank lever 28—25, rod 23, and rock arm 22 to the shaft 16. This variation in throw varies the lift to the valve and governs the valve in the ordinary manner. If, however, it is desired to change the speed manually or otherwise, another control is provided which is effected by shifting the lay shaft endwise. As shown, this is done by the pressure scheme involving the moving diaphragm 14 which forces the push rod 38a, the action of the rod being communicated through the sleeve 38 to the end of the shaft. This action of the shaft carries the actuating cams endwise and presents different cam surfaces to the valve lifting bell crank 14, and consequently makes a manual control which is effective regardless of the governor action.

What I claim as new is:

1. In an engine control mechanism, the combination of controlling inlet valves, a valve actuating oscillatorily reciprocating shaft, mechanism communicating movement of the shaft to the valves, and two controlling means for the mechanism, one of said controlling means being made effective through endwise relative movement of the shaft and the other made effective through variation of the oscillatorily reciprocative movement communicated from the shaft to the valves.

2. In an engine control mechanism, the combination of controlling inlet valves, a valve actuating oscillatorily reciprocating shaft, mechanism communicating movement of the shaft to the valves, and two controlling means for the mechanism, one responsive to speed of the engine and the other responsive to a direct control action, one of said controls being made effective through endwise relative movement of the shaft and the other made effective through variation of the oscillatorily reciprocative movement communicated from the shaft to the valves.

3. In an engine control mechanism, the combination of controlling inlet valves, a governor actuated oscillatorily reciprocating shaft for actuating said valves, mechanism communicating the movement of the shaft to the valves, and a second controlling means for said valves made effective by an endwise movement of the shaft.

4. In an engine control mechanism, the combination of controlling inlet valves, a valve actuating controlling shaft having actuating cams varying in throw circumferentially and longitudinally, means actuated by the cams communicating the action of the cams to the valves, and means varying the rotatively directed movement of the shaft for one control and moving the shaft endwise to effect a second control through variation in the active cam surfaces.

5. In an engine control mechanism, the combination of controlling inlet valves, a governor controlled oscillatorily reciprocating shaft having actuating cams varying in throw circumferentially and longitudinally arranged on said shaft, means actuated by the cams communicating the rotatively directed movement of the shaft to the valves, and means moving the shaft endwise for a direct control of the valves, the governor taking control at an abnormal speed.

6. In an engine control mechanism, the combination of controlling inlet valves, a valve actuating shaft having rotatively directed and endwise movement, mechanism communicating the rotatively directed movement of the shaft to the valves, and two controlling means for the mechanism, one of said controlling means being made effective through endwise movement of the means and the other made effective through variations of movement responsive to rotative action of the shaft as communicated through the mechanism to the valves.

7. In an engine control mechanism, the combination of controlling inlet valves, a valve actuating oscillatorily reciprocating shaft, mechanism communicating movement of the shaft to the valves, and two controlling means for the shaft, one of said controlling means being made effective through endwise movement of the shaft and the other made effective through variations in the oscillatorily reciprocating movement of the shaft.

8. In an engine control mechanism, the combination of controlling inlet valves, a valve actuating oscillatorily reciprocating shaft, mechanism communicating movement of the shaft to the valves, and two controlling means for the mechanism, one of said controlling means being made effective through endwise relative movement of the means and the other made effective through variation of the oscillatorily reciprocative movement communicated from the shaft to the valves.

J. LE GRAND SKINNER.